Dec. 19, 1939. E. HUBER 2,183,745

THERMOSTATIC TEMPERATURE REGULATOR

Filed July 14, 1937

INVENTOR
Ernst Huber
BY
Morgan Finnegan & Durham
ATTORNEYS

Patented Dec. 19, 1939

2,183,745

UNITED STATES PATENT OFFICE 2,183,745

THERMOSTATIC TEMPERATURE REGULATOR

Ernst Huber, Zug, Switzerland, assignor to Landis & Gyr, A.-G., a corporation of Switzerland Application July 14, 1937, Serial No. 153,480
In Switzerland July 31, 1936

13 Claims. (Cl. 200—137)

The invention relates to new and useful improvements in automatic temperature regulators, and more especially to such improvements in regulators wherein resiliently mounted circuit controlling means and a permanent magnetic field are governed by a temperature responsive element to have opposite movement effected by changes of temperature.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 1:
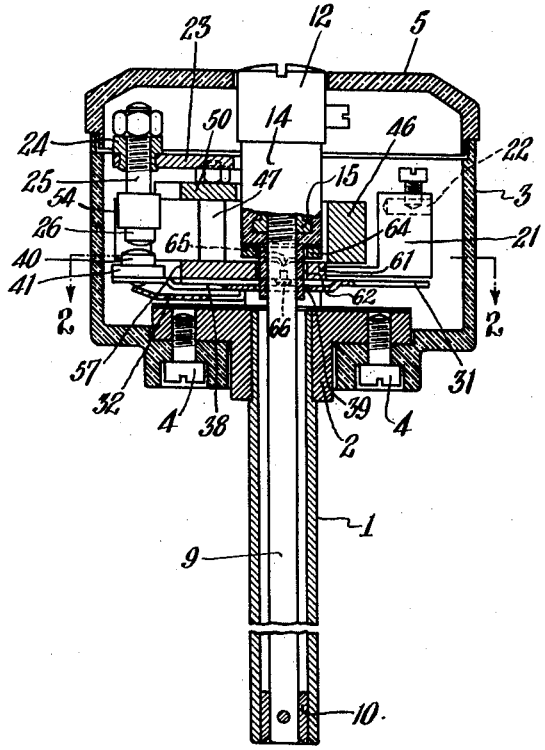
Fig. 1 is a central vertical section of a mechanism embodying the invention.
Figure 2:
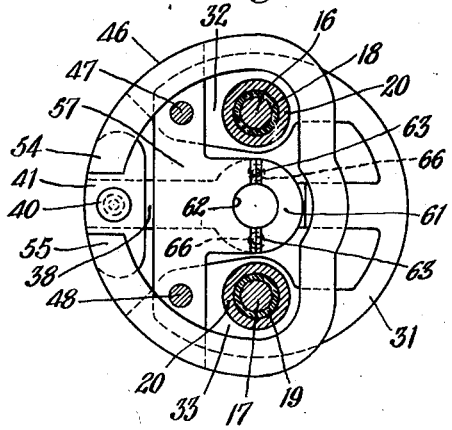
Fig. 2 is a horizontal section on line II—II of Fig. 1.
Figure 3:
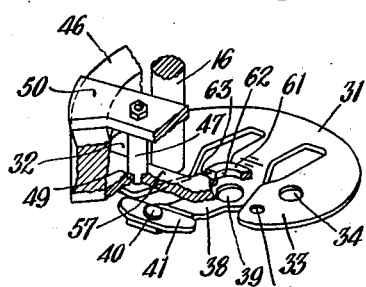
Fig. 3 is a fragmentary perspective of the spring mounting for the magnet and circuit terminal.

Objects of the invention are to provide a mechanism of the kind described wherein a permanent magnetic field co-operates with the temperature responsive actuating means to impart sensitive, accurate and immediate response to changes in temperature; to provide a compact and relatively simple and inexpensive mechanism for accomplishing these aims, and to these ends to provide a mechanism wherein both the movable circuit terminal and the magnet are resiliently mounted and are simultaneously actuated by the temperature responsive means.

Referring now in detail to the embodiment of the invention, illustrated by way of example in the accompanying drawing, the temperature responsive means comprises a tube 1 which extends into the chamber containing the fluid or other medium the temperature of which is to be regulated. This tube supports externally to said chamber the controlling mechanism for the heat supply, shown as an electrical switch and its controlling mechanism, the supporting means comprising a circular, shouldered disc 2, fixed on the outer end of the tube 1. An outer cylindrical casing 3, which encloses the entire mechanism, is fastened by screws 4 to the rear face of plate 2. A removable cover 5 fits onto the outer face of the casing 3.

The tube 1 is of a metal or other material having a high coefficient of expansion, and the inner end thereof, which is within the temperature regulated chamber, is closed. The cooperating temperature responsive element, having a relative low coefficient of expansion, comprises a rod 9 within the tube 1, and having at its inner end a collar 10 fitting within and riveted to, and constituting a seal for, the inner end of tube 1. Rod 9 extends beyond the outer end of tube 1 into the casing 3, and has at its outer end an adjustment device 12, operable from without the casing. Said device comprises a hollow cylindrical cap 14 adjustably mounted on the end of rod 9, and having a slot in its outer face which is accessible through a central opening in the cover 5. Fixed within cap 14 is a nut 15 screw-threaded on the outer end of rod 9. By turning cap 14 and nut 15, the action of the rod 9 on the circuit actuating means, due to the expansion and contraction of tube 1, may be regulated as hereinafter described.

In accordance with certain features of the invention, the circuit terminals of the heat supply controlling circuit and the magnet cooperating therewith are both resiliently mounted, so that movement of the temperature responsive means will move the circuit terminal to make or break the circuit and will effect concurrent opposite relative movement of the poles of the magnet. As embodied, the resilient mountings for both the circuit terminal and magnet are so devised that a member moving with the rod 9 will resiliently move in one direction a circuit terminal, which is under the influence of the magnetic field, and will move the poles of the magnet in the opposite direction.

In said embodiment, pillars 16 and 17 are fixed in and project from the supporting disc 2, and are surrounded by insulating sleeves 18 and 19, and spacing collars 20 surround the pillars 16 and 17. The connections for one of the circuit terminals are supported on the pillars 16 and 17 and comprise a binding post 21, having a circuit wire connection 22, and a terminal-supporting plate 23 is connected to the binding post. Mounted in the outer end of plate 23, in line with the air gap of the magnet, is a bushing 24, and set into the bushing is a bolt 25, which projects downwardly and carries at its bottom end the stationary circuit terminal 26.

As embodied, both the movable circuit terminal and the magnet are mounted on the same resilient plate, capacitated to impart to them, through a single connection from the temperature responsive means the desired movement in opposite directions. A resilient partly-circular plate 31 has two opposite outer segmental arms 32 and 33, having apertures 34 fitting over the respective pillars 16 and 17, which constitute supporting points for the plate 31 and are preferably in alinement with rod 9. The plate 31 has also a central, integral resilient arm 38, extending forwardly from the central part of the plate. Arm 38 has an opening 39 which loosely embraces the tube 9, the forward end of the arm terminating at the air gap of the magnet. On this forward or outer end of arm 38 are mounted the outer circuit terminal 40 and the armature 41 of the magnet.

The magnet 46 is mounted on the resilient, forwardly-extending ends of the two outer arms 32 and 33 of the spring plate 31. For this purpose short pillars 47 and 48 are fixedly mounted in openings 49 in the arms 32 and 33. A transversely-disposed magnet supporting plate 50 is fixed on the ends of pillars 47 and 48, and at its outer ends this plate is fixed to the top face of the curved magnet 46, the magnet having its poles 54 and 55 at the armature 41 with the movable circuit terminal 40 in the air gap. Another transversely-extending magnet supporting plate 57 is fitted about the pillars 47 and 48 and rests on the spring arms 32 and 33. The outer ends of plate 57 extend beneath and support the bottom face of the magnet 46.

The common actuating means by which the temperature responsive means simultaneously moves the circuit terminal 40 and magnet poles 54 and 55 comprises an arm 61 integral with the bottom support plate 57 and extending rearwardly from the central part thereof. Arm 61 has a central aperture 62 which loosely embraces rod 9. In the top face of arm 61, on opposite sides of the aperture 62, are grooves 63, with which cooperate the connections from the temperature responsive rod 9. On the bottom annular face of the adjustable cap 14 is a collar 64, which has on its bottom face two knife edge projections 65, which fit into the grooves 63 with nice contact. As means for simultaneously moving the long resilient arm 38, there is fixed in the bottom face of the arm 61 at either side of the opening 62 and just beneath the grooves 63, projecting contact heads 66, which bear on the top face of spring arm 38, which carries the magnet armature 41 and the movable circuit terminal 40.

Suitable spacing washers and supports and suitable insulating means are employed, but need not be described and in part are omitted from the drawing for the sake of clearness. A supporting plate 67 is carried on the lower parts of pillars 16 and 17, and its central part forms a downward limit support beneath the outer end of spring arm 38.

The mechanism described operates as follows: The mechanism may be regarded as approaching the top temperature limit and tube 1 expands, the rod 9 is moved downwardly and the projections 65 bearing in the grooves 63, force arm 61 downwardly and pillars 47, mounted on the resilient plates 32 and 33, are thereby slightly tilted backwardly moving the poles 54 and 55 of the magnet upwardly. At the same time, contact heads 66 move spring arm 38 downwardly and the circuit terminal 40 and armature 41 are moved to open-circuit position. At the same time a magnetic stress is created which tends to draw the armature back toward the poles and holds the arm 38 under tension firmly against its actuating parts. As the temperature falls, tube 1 contracts, rod 9 moves upwardly, and projections 65 with it. The spring action concurrently swings the magnet poles downwardly and moves armature 41 and contact 40 upwardly, the magnetic pull acting simultaneously to bring the parts back to closed circuit position.

The invention in its broader aspects is not limited to the specific mechanism shown and described but departures may be made therefrom within the scope of the accompanying claims without departing from the principles of the invention and without sacrificing its chief advantages.

What I claim is:

1. A thermostatic temperature regulating device including in combination a temperature responsive device comprising a movable rod, a pair of circuit terminals, side-by-side resilient arms of different lengths, a central arm being of greater length and carrying at its free end one of said circuit terminals and a magnet armature, a magnet supported on shorter resilient side arms and having its poles adjacent to said armature and terminal, and connections from said rod whereby movement of the rod will flex said central arm in one direction and said side arms in the opposite direction to effect opposite relative movement of the magnet poles and of the armature and terminal in response to temperature changes.

2. A thermostatic temperature regulating device including in combination a temperature responsive device comprising a movable rod, a pair of circuit terminals, side-by-side resilient arms of different lengths, a central arm being of greater length and extending past said rod, and carrying at its free end one of said circuit terminals and a magnet armature, a magnet supported on shorter resilient side arms and having its poles adjacent to said armature and terminal, a member extending from said magnet and side arms to said rod, and connections from said rod operating on said member and said central arm to flex said central arm in one direction and said side arms in the opposite direction to effect opposite relative movement of the magnet poles and of the armature and terminal in response to temperature changes.

3. A thermostatic temperature regulating device including in combination a temperature responsive device comprising a movable rod, a pair of circuit terminals, a resilient plate having a central and side arms, fixed supports for the plate at median points in the side arms, a magnet armature and one of said terminals being mounted on the free end of said central arm, a magnet mounted near the free ends of said side arms, the poles of the magnet being adjacent to said armature and terminal, a rigid member extending from said magnet toward said rod, and connections from said rod operating simultaneously on said rigid member and said central arm to flex said central arm in one direction and said side arms in the opposite direction to effect opposite relative movement of the magnet poles and of the armature and terminal in response to temperature changes.

4. A thermostatic temperature regulating device including in combination a temperature responsive device comprising a movable rod, a pair of circuit terminals, a resilient plate having a central and side arms, fixed supports for the plate at median points in the side arms, said supports and rod being in alinement, a magnet armature and one of said terminals being mounted on the free end of said central arm, a magnet mounted near the free ends of said arms, the poles of the magnet being adjacent to said armature and terminal, a rigid arm extending from said magnet toward said rod, and connections from said rod operating simultaneously on said rigid member and said central arm to flex said central arm in one direction and said side arms in the opposite direction to effect opposite relative movement of the magnet poles and of the armature and terminal in response to temperature changes.

5. A thermostatic temperature regulating device including in combination a temperature responsive device comprising a movable rod, a pair of circuit terminals, side-by-side resilient arms of different lengths, comprising a central arm being of greater length and carrying at its free end one of said circuit terminals and a magnet armature, a magnet having its poles adjacent to said armature and terminal, supporting means for said magnet comprising studs mounted on said shorter side resilient arms, the magnet being mounted on said studs, a rigid arm extending from said magnet mounting toward said rod, and connections from said rod whereby movement of the rod will simultaneously flex said central arm in one direction and said side arms and studs in the opposite direction to effect opposite relative movement of the magnet poles and of the armature and terminal in response to temperature changes.

6. A thermostatic temperature regulating device including in combination a temperature responsive device comprising a movable rod, a pair of circuit terminals, side-by-side resilient arms of different lengths, comprising a central arm being of greater length, and extending past said rod, and carrying at its free end one of said circuit terminals and a magnet armature, and shorter side arms having fixed supports substantially in alinement with said rod, a magnet having its poles adjacent to said armature and terminal, supporting means for said magnet comprising studs mounted near the free ends of said shorter side resilient arms, a rigid frame extending between and fixed to said rod, said magnet being mounted on said frame, a rigid arm extending from said frame toward said rod, connections from said rod whereby movement of the rod will simultaneously move said central arm in one direction and said magnet in the opposite direction to effect opposite relative movement of the magnet poles and of the armature terminal in response to temperature changes.

7. A thermostatic temperature regulating device including in combination circuit terminals, one of said terminals being mounted on a resilient support, a magnet and a resilient support therefor, and temperature responsive means including a member movable by temperature increase to simultaneously bend both said resilient supports to move said magnet poles and said movable terminal simultaneously in opposite directions.

8. A thermostatic temperature regulating device including in combination circuit terminals, one of said terminals being mounted on a resilient support, a magnet and a resilient support therefor, and temperature responsive means having a common device including a member movable by temperature increase to simultaneously bend both said resilient supports to move said magnet poles and said movable terminal simultaneously in opposite directions.

9. A thermostatic temperature regulating device including in combination circuit terminals, a resilient support on which one of said terminals is mounted, an armature mounted on said resilient support, a magnet, a resilient support on which said magnet is mounted, and temperature responsive means including a member movable by temperature increase to simultaneously bend both said resilient supports to move said magnet poles and said resiliently mounted terminal in opposite directions.

10. A thermostatic device for regulating temperatures within a chamber, including in combination a temperature responsive device comprising a tube adapted to project through a wall into a chamber and a rod within and fixed to the tube, circuit controlling means mounted on said tube exteriorly to the chamber including a movably mounted magnet, a terminal located at the air gap of the magnet and movable to close and open a circuit, and connections between said rod and the magnet and movable terminal for simultaneously moving the terminal and magnet in opposite directions.

11. A thermostatic device for regulating temperatures within a chamber, including in combination a temperature responsive device comprising a tube adapted to project through a wall into a chamber and a rod within and fixed to the tube, circuit controlling means mounted on said tube exteriorly to the chamber including a terminal and a resilient support therefor to close and open a circuit, resilient supports and a magnet mounted thereon, and connections between said rod and said resilient supports for bending both said supports to move the terminal and magnet in opposite directions.

12. A thermostatic device for regulating temperatures within a chamber, including in combination a temperature responsive device comprising a tube adapted to project through a wall into a chamber and a rod within and fixed to the tube, and extending beyond the outer end of the tube, circuit controlling means mounted on said tube exteriorly to the chamber including a support mounted at one side of the rod and extending past it, a terminal mounted on said support at the other side of the rod, a curved magnet encircling said rod and a movable support therefor, and connections between said rod and said magnet support and said terminal support for simultaneously moving the terminal and magnet in opposite directions.

13. A thermostatic temperature regulating device including in combination a temperature responsive device comprising a longitudinally movable rod, a plurality of arms mounted at one side of said rod and extending past the rod, a bent magnet encircling said rod, and mounted on at least one of said arms, a pair of terminals mounted on at least one of said arms, one terminal being movable and located at the air gap of the magnet, and connections from said movable rod to said arms to simultaneously move the magnet poles and the movable terminal in opposite directions.

ERNST HUBER.